(12) United States Patent
Noordover et al.

(10) Patent No.: US 8,487,038 B2
(45) Date of Patent: Jul. 16, 2013

(54) POLYCARBONATE AND PROCESS FOR PRODUCING THE SAME

(75) Inventors: Bart Noordover, Eindhoven (NL);
Robbert Duchateau, Eindhoven (NL);
Cornelis Koning, Eindhoven (NL);
Rudolfus Van Benthem, Eindhoven (NL); Daniel Haveman, Eindhoven (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 385 days.

(21) Appl. No.: 12/677,954

(22) PCT Filed: Aug. 22, 2008

(86) PCT No.: PCT/EP2008/061041
§ 371 (c)(1),
(2), (4) Date: Oct. 25, 2010

(87) PCT Pub. No.: WO2009/033934
PCT Pub. Date: Mar. 19, 2009

(65) Prior Publication Data
US 2011/0034616 A1      Feb. 10, 2011

(30) Foreign Application Priority Data
Sep. 13, 2007 (EP) .................... 07116306

(51) Int. Cl.
*C08G 18/08* (2006.01)
(52) U.S. Cl.
USPC ............ 524/590; 524/386; 524/589; 524/611
(58) Field of Classification Search
USPC .................. 524/386, 589, 590, 611
See application file for complete search history.

(56) References Cited

U.S. PATENT DOCUMENTS 6,156,866 A    12/2000  Schuhmacher et al.
2005/0143554 A1 *  6/2005  Dhara et al. ............... 528/196

FOREIGN PATENT DOCUMENTS

| EP | 1 640 400 | 3/2006 |
|---|---|---|
| EP | 1 647 566 | 4/2006 |
| EP | 1 777 258 | 4/2007 |
| EP | 1 777 259 | 4/2007 |
| JP | 2003-292603 | 10/2003 |
| WO | 2004/029128 | 4/2004 |
| WO | 2004/072159 | 8/2004 |
| WO | 2004/097853 | 11/2004 |
| WO | 2005/066239 | 7/2005 |
| WO | WO 2005/066239 | 7/2005 |
| WO | 2005/090436 | 9/2005 |
| WO | 2005090435 | 9/2005 |

OTHER PUBLICATIONS

International Search Report for PCT/EP2008/061041, mailed Oct. 31, 2008.
Abstract, Database WPI Week 200757, Accession No. 2007-602999, (Jun. 7, 2007).
Abstract, Database WPI Week 200757, Accession No. 2007-602999, XP-002467801, Jun. 2007.

* cited by examiner

*Primary Examiner* — Edward Cain
(74) *Attorney, Agent, or Firm* — Nixon & Vanderhye P.C.

(57) ABSTRACT

The invention relates to polycarbonate containing a dianhydrohexitol residue, obtainable from a polysaccharide, and a polyol residue, wherein the polycarbonate comprises between 0.2 and 5 mmol hydroxyl groups per gram polymer. The polycarbonate may be branched and comprises functional groups that can react with suitable crosslinkers. The polycarbonate can be used in for example coating compositions.

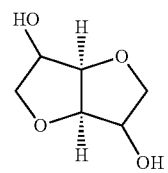

(1)

21 Claims, No Drawings

POLYCARBONATE AND PROCESS FOR PRODUCING THE SAME

This application is the U.S. national phase of International Application No. PCT/EP2008/061041 filed 22 Aug. 2008, which designated the U.S. and claims priority to EP Application No. 07116306.7 filed 13 Sep. 2007, the entire contents of each of which are hereby incorporated by reference.

The present invention relates to polycarbonates containing a moiety which can be derived from a polysaccharide of renewable resources and having an excellent heat resistance, methods for producing thereof and use of the polycarbonates in coating applications.

Polycarbonates are generally produced by using raw materials which can be obtained from oil resources. Because of the concern about the exhaustion of oil resources, it is desired to produce polycarbonates by using raw materials obtainable from renewable resources such as plants.

On the other hand, a bicyclic ether diol expressed by the following formula (1) can be easily prepared from renewable resources, for example, polysaccharide, starch or the like. The ether diol has three kinds of stereoisomers. In concrete terms, they are 1,4: 3,6-dianhydro-D-sorbitol (hereafter, this compound will be referred as to "isosorbide" in this description) expressed by the following formula (2), 1,4: 3,6-dianhydro-D-mannitol (hereafter, this compound will be referred as to "isomannide" in this description) expressed by the following formula (3), and 1,4: 3,6-dianhydro-L-iditol (hereafter, this compound will be referred as to "isoidide" in this description) expressed by the following formula (4).

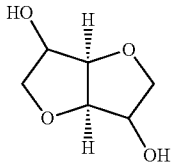

formula 1

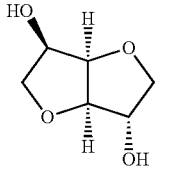

formula 2

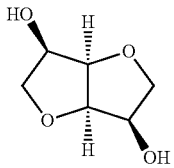

formula 3

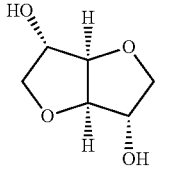

formula 4

Isosorbide, isomannide and isoidide can be produced from D-glucose, D-mannose and L-idose, respectively. For example, isosorbide can be produced by hydrogenating D-glucose followed by dehydration with an acid catalyst.

Heretofore, it was studied to incorporate especially isosorbide among the above-mentioned ether diols into a polycarbonate as the main monomer (for example, German unexamined patent publication No. 2938464, Journal fuer praktische Chemie, p. 298-310, vol. 334, 1992, Macromolecules, p. 8077-8082, vol. 29, 1996, and Journal of Applied Polymer Science, p. 872-880, vol. 86, 2002).

However, isosorbide-derived polycarbonates have a problem of poor moldability, which is caused by extremely high glass transition temperatures and melt viscosities due to their rigid structures.

Further, methods for producing copolycarbonates which contain isosorbide and a diphenol of various types were reported (for example, JP-A 56-110723, Macromolecular Chemistry and Physics, p. 2197-2210, vol. 198, 1997, Journal of Polymer Science Part A, p. 1611-1619, vol. 35, 1997, and Journal of Polymer Science: Part A, p. 1125-1133, vol. 37, 1999). These copolycarbonates have the disadvantage that the bisphenols are derived from oil, which is not considered to be a renewable resource.

On the other hand, speaking of polycarbonates which are derived from aliphatic diols, glass transition temperatures of the polycarbonates which are derived from ethylene glycol, 1,4-butanediol, 1,5-pentanediol, 1,6-hexanediol or the like are 0-5° C., −35° C., −41° C. and −50° C., respectively (for example, Journal of Polymer Science: Polymer Letters Edition, p. 599-602, vol. 18, 1980, Macromolecular Chemistry and Physics, p. 97-102, vol. 199, 1998, and Polycarbonate resin handbook, edited by Seiichi Honma, Nikkan Kogyo Shinbun Co. p. 21, 1992).

It is possible to use renewable resources as these aliphatic diols, but aliphatic diol-derived polycarbonates are usually oily substances or solids with low melting points due to their flexible structures, and they have shortcomings of poor heat resistances. Polycarbonate copolymers derived from an aliphatic diol and having a higher glass transition temperature have never been reported.

Further, although reports concerning copolycarbonates of isosorbide and an aliphatic diol are few, as one of them we can find a report of copolycarbonates of an aliphatic diol such as 1,4-butanediol, 1,6-hexanediol, 1,8-octanediol or 1,10-decanediol, and isosorbide (for example, Okada et al, Abstract of the seventh open symposium on "Polymers with low environmental loads": Construction of a sustainable material system based on production of plastics with low environmental loads from renewable resources, Scientific Research on Priority Areas (B) supported by Grant-in-Aid for Scientific Research of Ministry of Education, Culture, Sports, Science and Technology, p. 26-29, 2002, and Journal of Polymer Science: Part A, p. 2312-2321, vol. 41, 2003).

These polycarbonates are block copolymers or random copolymers, and their glass transition temperatures become lower with increasing lengths of aliphatic chains. These glass transition temperatures (Tg) have been determined as 65° C. or 59° C., 26° C. or 20° C., 12° C. or 23° C., and −1° C. or 7° C., respectively, and they are poor in heat resistances.

US 2006/0149024 discloses polycarbonates prepared from isosorbide, isomannide or isoidide with aliphatic diols. The polycarbonates have Tg values from 90 to 160° C., high molecular weights and relatively high contents of polysaccharide derived ether diol. The polycarbonates are prepared in such a way that they have unreactive endgroups, like for example phenoxy endgroups. This makes the polycarbonates suitable for using as a polymer or as a mixture with other polymers. These polycarbonates cannot be used in systems where they form part of a network structure, or where chemical reactivity of endgroups is needed.

More publications exist that disclose polycarbonates prepared from isosorbide, isomannide or isoidide with aliphatic diols. In all cases these polymers have phenyl endgroups, sometimes the polymers have a limited number of OH groups, like for example less then one OH group per polymer chain. Examples of such publications are EP 1 640 400, JP 2003 292 603, U.S. Pat. No. 6,156,866 and WO 2005/066239.

WO 2006/089940 describes hyperbranched polycarbonates having reactive endgroups, but these systems are not prepared from renewable monomers. The polycarbonates have further very low molecular weigths and low Tg's, which makes them not applicable to any applications where reasonable mechanical properties are needed, or where a Tg above room temperature is required.

It is an object of the present invention to prepare polycarbonates, at least partly from renewable resources, wherein the polycarbonates have reactive endgroups, which can be used to make articles for example by crosslinking the polycarbonate with suitable crosslinkers. Articles can be three dimensional objects, but also films and coatings and the like.

It is another object of the present invention to provide new polycarbonates and materials comprising polycarbonate moieties having an excellent heat resistance, moldability, color stability and/or transparency.

It is a further object of the present invention to provide a process for making the new polycarbonates of the present invention.

The present invention relates to a polycarbonate containing an ether diol residue producible from a polysaccharide and expressed by the following formula (5)

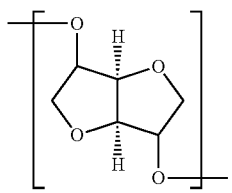

formula 5 and a polyol residue, wherein the polycarbonate comprises between 0.2 and 5 mmol hydroxyl groups per gram polymer In a preferred embodiment of the invention, the polycarbonate has a number average molecular weight between 1000 and 10.000 gram/mol, so that the polycarbonate can be easily handled and the number of reactive hydroxyl endgroups is sufficiently high for the performance of chemical reactions.

DETAILED DESCRIPTION OF THE INVENTION

The polycarbonate of the present invention contains an ether diol (1) repeating unit according to formula (6).

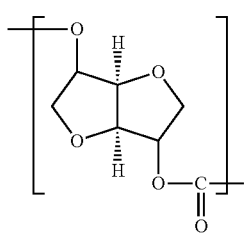

formula 6

The polycarbonate also contains as a second repeating unit a molecule with the general structure according to formula (7).

—(O—Y—O—C(=O)—)—                formula 7 wherein Y is a hydrocarbyl compound derived from a polyol as described below. Y may be linear (when it is derived from a diol) or branched (when it is derived from a polyol having more then 2 hydroxyl groups).

These polysaccharide-derived ether diols (ether diols (1)) are materials which can be obtained from biomass, and one of the materials which are called renewable resources. Isosorbide can be produced by hydrogenating D-glucose, which is obtainable from starch, and dehydrating the hydrogenated product. The other ether diols (1) can be produced by the similar reactions using different starting materials.

Specific examples of the ether diols (1) include isosorbide, isomannide and isoidide, which are expressed by the above-mentioned formulae (2), (3) and (4), respectively, and others.

Especially, a polycarbonate containing the isosorbide residue as the ether diol (1) residue is preferable. Isosorbide is an ether diol (1) which can easily be produced from starch or the like, so that it is abundantly obtainable as a raw material. Polycarbonates prepared with isosorbide as ether diol (1) are amorphous polymers and show advantages in ease in production, excellences of properties and broad ranges of usage. The use of isoidide also shows a number of advantages. The reactivity of both hydroxyl groups of isoidide is high due to their exo-orientation, which gives advantages in further reactions as described in the present invention. Also, polycarbonates based on isoidide are semi-crystalline materials, which may also give distinct advantages in mechanical properties for example.

The amount of ether diol (1) ranges between 10 and 99 wt %, preferably between 30 and 95 wt %, more preferably between 50 and 90 wt % of the polycarbonate.

The polycarbonate further comprises a polyol compound. A polyol compound is a hydrocarbyl compound having at least 2 hydroxy groups. The hydrocarbyl compound can contain heteroatoms like for example N, O, Si, B, S, P, F, Cl, Br and I. It is preferred to apply one or more aliphatic polyol compounds in view of color stability of the formed polycarbonate. Aliphatic polyol compounds can have linear, branched and/or saturated cyclic structures. The aliphatic compounds can contain heteroatoms like for example O, N, Si, B, S, P or halogen atoms.

In one embodiment of the invention the polyol is an aliphatic compound having between 2 and 6 hydroxy groups. In a preferred embodiment the aliphatic polyol is a mixture of at least two different polyols, containing a polyol having 2 hydroxy groups (a diol compound) and a polyol containing between 3 and 6 hydroxyl groups (a polyol (3-6)). It is most preferred that the polyol compound comprises at least one diol and at least one triol compound (a compound having 3OH groups). The use of mixtures of diols and polyols (3-6), like for example triols, renders polycarbonates having branched structures and a plurality of hydroxyl endgroups. The presence of multiple hydroxyl functional groups in the polycarbonate of the present invention gives a number of advantages, like for example enhanced functionality, improved coating properties due to higher cross-link density such as better mechanical performance and better chemical resistances for solvents and stains, better adhesion to metals (if some free OH-groups are present in the final film), possibility of tuning Tg, melt viscosity and shear thinning behavior by controlling the degree of branching. When increasing the degree of branching, the melt viscosity and melt strength increase, which can be advantageous for blow molding purposes. The shear thinning tendency also increases with increasing degree of branching, which can be favorable for processing techniques such as extrusion and injection moulding.

Preferably the polycarbonate of the present invention comprises at least 1,8 OH group per molecule, more preferably at least 2OH groups per molecule. The amounts of OH group per molecule (mol OH/mol polymer) are calculated by multiplying the amount of OH groups (mmol/gram of polymer) by the Mn of the polymer (gram/mol).

The molecular weight of the polyol preferably is between 50 and 250 g/mol. Examples of suitable diols are ethylene glycol, diethylene glycol, polyethylene glycol, propylene glycol, dipropylene glycol and polypropylene glycols, 1,5-pentanediol, cyclohexanediol, cyclohexanedimethanol, propane-1,2-diol, propane-1,3-diol, butane-1,2-diol, butane-1,3-diol, butane-1,4-diol, butane-2,3-diol, 2,2-dimethylpropanediol-1,3 (=neopentyl glycol), hexane-2,5-diol, hexane-1,6-diol, 2,2-bis-(4hydroxy-cyclohexyl)-propane (hydrogenated bisphenol-A), 2,2-bis[4-(2-hydroxy ethoxy)-phenyl]propane, the hydroxy pivalic ester of neopentyl glycol, butylethylpropane diol, ethylmethylpropane diol, hydrogenated bisphenol-A, 2,2-bis-(2-hydroxyethoxy)phenylpropane and 2,2-bis-2-hydroxypropoxy phenylpropane.

Preferred diols are chosen from the group consisting of ethylene glycol, diethyleneglycol, propyleneglycol, 1,3-propanediol, 1,4-butanediol, neopentyl glycol, 1,6-hexanediol, 1,5-pentanediol, cyclohexanedimethanol, 2,3-butanediol, cyclohexanediol and propane-1,2-diol.

Examples of aromatic diols included dimethanolbenzene, bisphenol A and diethanolbenzene.

Examples of polyols (3-6) include trimethylolpropane, trimethylol ethane, glycerol, pentaerythritol, dipentaerythritol, hexanetriol, 1,3,5-cyclohexanetriol, sorbitol, sucrose, and tris-(2-hydroxyethyl)-isocyanurate or the like and the polyols having 3-6 OH groups which are extended with one or more ethyleneoxide or propyleneoxide units.

Preferred polyols (3-6) are chosen from the group consisting of trimethylolpropane, trimethylolethane, pentaerythritol, 1,3,5-cyclohexanetriol, glycerol and sorbitol.

The amount of diols in the polycarbonates of the invention range between 1 and 90 wt %, preferably between 10 and 70 wt %. When the polycarbonates of the present invention are used in applications like powder coatings, where a Tg above room temperature is preferred, the amount of diol preferably ranges between 30 and 50 wt %

The amount of polyols (3-6) ranges between 0-7 wt %, more preferably between 1 and 6 wt %.

The ratio diols to polyols (3-6) ranges between 4 and 50, more preferably between 5 and 20, or between 6 and 17.

The polycarbonates of the present invention have endgroups which are preferably hydroxyl groups. Preferably the polycarbonate comprises between 0.3 and 2 mmol hydroxyl groups per gram of polymer, more preferably between 0.4 and 1.5 mmol hydroxyl groups per gram of polymer The number of hydroxyl groups is determined with potentiometric titration as defined in the experimental section.

The molecular weight of the polycarbonate preferably ranges between 500 and 25,000 g/mol (number average molecular weight), more preferably between 750 and 10,000, most preferably between 1000 and 5000, or between 1500 and 4000 g/mol.

The glass transition temperature of the polycarbonates of the present invention range from −10 to 180° C., preferably from 0 to 150° C., more preferably between 30 and 100° C.

An important advantage of the polycarbonates of the present invention is that they have residual reactive hydroxyl functional groups. The hydroxyl functional groups can be crosslinked with for example polyisocyanates (having free or blocked —NCO groups), which leads to poly(carbonate urethane) networks.

Alternatively, the hydroxyl groups can be used for chain extension or blockcopolymerisation of the polycarbonates. For example the OH-functional polycarbonate can be endcapped with for example diisocyanates (reagents based on HMDI, isphorone diisocyanate, etc), yielding NCO-functionalized polycarbonates. These can be used for example as polyurethane latex. The NCO-functionalized polycarbonates can be reacted with for example (crystallizable) diamine blocks (forming poly(carbonate urea)s, polyamine (like for example melamine, forming cross-linked poly(carbonate urea)s) and/or polyols.

In general such a NCO-functional oligo- or polycarbonate can be used as an amorphous resin. In a different embodiment of the present invention the linear or branched OH-functional polycarbonate of the invention can be reacted as such with a diisocyanate to yield chain extended poly(carbonate urethanes), branched or cross-linked, having a high molecular weight. It is also possible to react the hydroxyl functional polycarbonates with carboxylic acid/anhydride containing moieties, capable of forming anhydrides at the chain end (for example citric acid, 1,2,3-propanetricarbyxylic acid, trimellitic anhydride etc). The anhydride functionalized polycarbonates can be cured with di- or polyamines, polyalcohols and (poly)epoxies The reaction of the polycarbonates of the present invention with isocyanate-functional polymers yields novel block-copolymers. Reaction of the polycarbonates with cross-linking agents like polyisocyanates yields a three dimensional object, a coating or a film which has a high impact resistance (tough material), hardness, excellent transparency, chemical resistivity and good appearance with respect to color and gloss. Also, the aliphatic polycarbonate coatings have good UV-stability.

The hydroxyl functional groups can also be converted to other functional groups. For example they can be reacted with acrylic acid chloride or methacrylic acid chloride to form a polycarbonate resin with UV-curable unsaturated endgroups. Acid/anhydride functional polycarbonates can be obtained by reacting OH-functional polycarbonate resins (with Tg=35-100° C.) in the melt with for example citric acid (biobased polyfunctional monomer) or succinic anhydride at 150-160° C. These can be further reacted with for example epoxy curing agents such as TGIC, triglycidyl trimellitate and diglycidyl terephthalate. In combination with high Tg polycarbonate resins (Tg>90° C.), epoxydized linseed oil (ELO) can be used to cure the system Also, β-hydroxyalkylamides having activated OH-groups can be used to cross-link acid- or anhydride-functional polycarbonates. These reactions will lead to poly(carbonate ester) networks.

The polycarbonates of the present invention have a number of advantages over regular aromatic polycarbonates or aliphatic polyester resins. The polycarbonates are (mainly) aliphatic systems, have a good UV-stability; they are biobased materials, have a tunable Tg, tunable melt viscosity, tunable degree of cross-linking by a proper choice of comonomers, ratio of monomers and choice of molecular weight of the polycarbonate; They show improved hydrolytic stability (due to carbonate links instead of often used ester links in polyester resins), improved toughness and transparency.

The invention also relates to a process for making the polycarbonates of the present invention. A number of different ways of making the polycarbonates of the present invention are available. Well known in the art are melt polycondensation, solution polymerisation in combination with highly reactive agents such as phosgene.

Melt polycondensation can be performed by using for example diphenyl carbonate or the separately synthesized diphenyl carbonates of the dianhydrohexitols according to formula (1) as carbonyl sources. The former is synthesized by reacting the ether diols with phenyl chloroformate (as described by Kricheldorf and Yokoe (see examples). By doing so, the moderately reactive OH-groups of the dianhydrohexitols (formula 1) are rapidly converted to carbonate moieties. The advantage of this procedure is that the subsequent polycondensation reaction, proceeding through transesterification of the dianhydrohexitol bis(phenyl carbonate)s with diols or polyols (3-6) will proceed more rapidly and the build-in of the dianhydrohexitols (formula 1) into the copolycarbonates is more efficient. The advantage of using diphenyl carbonate, on the other hand is its availability and the fact that a separate synthesis step is not necessary.

The melt polycondensation reactions can be carried out by heating the ether diol (1) and polyols with diphenyl carbonate at atmospheric pressure preferably in the presence of a polymerization catalyst, and subsequently stirring the reactants under reduced pressure while they are heated at 230° C. or less to distil off the formed phenol. The reaction system is preferably kept in an atmosphere of a gas such as nitrogen which is inert towards the raw materials, the reaction mixture and the reaction product. Besides nitrogen, the other inert gas such as argon is available. The amount of ether diols (1) and polyols is such that a stoichiometric excess of hydroxyl groups is present in the reaction mixture relative to the amount of carbonyl source and a hydroxyl functional polycarbonate is obtained after the reaction. The excess is preferably between 1 and 30%, more preferably between 10 and 20% relative to the amount of carbonyl source (on a molar basis).

Alternatively, the separately synthesized dianhydrohexitol bis(phenyl carbonate)s can be heated with polyols. In that case, also a molar excess of polyols is added to the dianhydrohexitol bis(phenyl carbonate). Also ether diol (1) can be added to the dianhydrohexitol bis(phenyl carbonate) in order to obtain polycarbonates with relatively high content of ether diol residue according to formula (1), and having a relatively high Tg.

At the initial stage of the reaction, it is preferable to carry out the heating reaction at atmospheric pressure. This progresses an oligomer forming reaction, so that when an aromatic alcohol such as phenol or an aliphatic alcohol is distilled off by reducing pressure at the later stage of the reaction, it is prevented that unreacted monomer distills off too early and changes the molar balance and lowers the degree of polymerization.

The reaction temperature preferably is kept as low as possible in order to prevent the decomposition of the ether diol (1), and obtain a resin less colored and having a high viscosity. However, for promoting the polymerization reaction properly, the polymerization temperature is preferably in the range from 180° C. to 280° C., more preferably in the range from 190° C. to 230° C.

In the melt polycondensation the use of a catalyst may accelerate the polycondensation reaction. Usable catalysts are (i) a nitrogen-containing basic compound, (ii) an alkali metal compound, (iii) an alkaline earth metal compound etc. These can be used singly or in combination of two kinds or more, and combined usages of (i) and (ii), (i) and (iii), and (i), (ii) and (iii) are often preferable. Examples of alkali metal compounds are zinc acetate, titanium butoxide, lithium hydroxide, and 2,2-bis(4-hydroxyphenyl)propane disodium salt. Suitable catalysts are known to the skilled man in the art A second route towards OH-functional polycarbonates is the reaction in solution of polyols with triphosgene in the presence of bases and/or HCl-scavengers such as pyridine or triethylamine. Triphosgene is a solid compound and is therefore convenient to manipulate. Under the influence of the polymerisation catalyst, phosgene is formed in situ and reacts rapidly with the available OH-groups of the ether diols (1) and the polyols present in the reaction mixture. Alternatively, diphosgene of phosgene can be used. Solvents such as dry dichloromethane and dioxane can be used, the reaction is in general performed at temperatures between −10 to 25° C. Due to the high reactivity of the phosgene moieties, the polymerisation can and should be performed at these relatively low temperatures. Again, the type of end-groups can be set by choosing the proper reaction stoichiometry. Other important reaction variables are monomer, (tri)phosgene and base concentration. Unwanted side products are cyclic chains, formed more easily at low monomer concentrations, relative to the (tri)phosgene concentration. Upon (repeated) precipitation of the polymer in polar solvents such as water or methanol, the polymer is separated by filtration and dried in vacuo. The materials is usually obtained as a powder, depending on its $T_g$.

Further, to the polycarbonates of the present invention, various function-imparting agents are optionally added according to the use of the polycarbonates. Such agents are, for example, heat stabilizers, stabilization adjuvants, plasticizers, antioxidants, photostabilizers, nucleating agents, heavy metal-inactivating agents, flame retardants, lubricants, antistatic agents, ultraviolet absorbers etc.

Further, depending on the use, the polycarbonates of the present invention can be optionally compounded with various organic or inorganic pigments, fillers, fibers etc. Examples of filler are carbon, talc, montmorillonite, hydrotalcite etc., and examples of fibers are various synthetic fibers, glass fibers, quartz fibers, carbon fibers etc. in addition to natural fibers such as kenaf.

As mentioned above, we can obtain polycarbonates containing a moiety which can be derived from renewable resources, and having excellent heat resistance.

By virtue of excellent heat resistance, the polycarbonates of the present invention can be widely used for various uses including optical parts such as optical sheets, optical disks, information disks, and optical lenses and prisms, various machine parts, building materials, car components, and various resin trays and dishes. The polycarbonates can be used especially preferably as film molded items such as optical sheets among these uses.

By virtue of biodegradability, the polycarbonates of the present invention can be used as films and sheets for agricultural materials including green house films, mulch films etc., packaging films and sheets for uses including food wrapping, general packaging, compost bags etc., industrial materials including tapes etc., various packaging containers etc. and molded articles for various uses in which the prevention of environmental contamination are needed.

Further, the polycarbonates of the present invention can be used after they are mixed and alloyed with a bio-based polymer, a synthetic resin, a rubber or the like of various types, for example, an aromatic polyester, an aromatic polycarbonate, a polyamide, polystyrene, a polyolefin, polyacrylic resin, ABS, a polyurethane etc. in addition to polylactic acid and an aliphatic polyester.

The polycarbonates of the present invention can be used in a number of different applications, like for example coating formulations (powder coatings and solvent or water borne systems), polyols for copolymer synthesis, construction resins, adhesives, inks, composites, molding compounds, sheets and glazings, films, elastomers, as flow agent or as a filler in polymeric systems.

The present invention also relates to articles made with the polycarbonates of the present inventions. Such articles can be for example construction resins, blow-molded objects and extrusion molded objects.

The polycarbonates of the present invention can be used in coating applications like powder coatings, solvent or water borne coating compositions. Use in powder coatings is advantageous because of the sufficiently high Tg and functionality, good flow, good UV and hydrolytic stability. Also excellent results can be achieved in solvent or in water borne systems (for example through curing of the OH-functional polycarbonates with conventional polyisocyanates based on 1,6-hexanediisocyanate, HMDI).

A powder coating composition comprises at least one resin and at least one crosslinker. With powder coating composition is here and hereinafter meant a solid composition that is suitable for application as a powder onto a substrate. With solid is here and hereinafter meant a compound that is solid at room temperature at atmospheric pressure. The glass temperature (Tg) of the powder coating composition lies at or above 20° C. Preferably the Tg lies above 35° C., more preferably above 45° C. The Tg is determined by differential scanning calorimetry (DSC) at a heating rate of 10° C./min.

The crosslinker present in the powder coating composition is not particularly critical. The nature of the crosslinker is determined by the nature of the functional groups in the resin. The functional groups on the crosslinker must be able to react with the functional groups in the resin. Examples of crosslinkers are epoxy resins, polyamines, isocyanates, a minoresins, polycarboxylic acids, acid anhydrides, polyphenols, Primid(R)-like compounds and combinations of any of them. Depending on the nature of the functional groups in the resin, the crosslinker will be chosen so as to react with the functional groups of the resin. The composition comprising at least the resin and the crosslinker will be cured. This curing process is well known to the man skilled in the art of making coatings. Examples of curing processes are thermal curing, curing with electromagnetic radiation, such as for example UV- or electron beam curing. Depending on the nature of the functional groups it is also possible to use two (dual-cure) or more types of curing processes.

A pigment may be present in the powder coating composition. The pigment can be of an inorganic or organic nature. With pigment is meant here and hereinafter a substance consisting of particles, which is practically insoluble in the binder and is used as a colorant (DIN 55943). A colorant is a color-imparting substance. With binder is meant the combination of resin and crosslinker. Pigments suitable for use in the coating composition according to the invention and in the powder coating composition are for example white pigments, coloured pigments, black pigments, special effect pigments and fluorescent pigments. Generally the pigment can be present in a coating composition and more specifically in a powder coating composition in an amount of 1-50 w/w %.

Additionally other components can be added to the powder coating composition, for example flow control agents, catalysts, fillers, light-stabilizers, biocides, and degassing agents.

The characteristics may be achieved after a curing time between for example 1 and 15 minutes at a temperature between for example 135° C. and 250° C.

Preferably, the groups of the crosslinker which are capable of reacting with hydroxyl groups are isocyanate groups.

The isocyanate functionality of the crosslinker is preferably equal or higher than 2 and is more preferably between 2 and 6.

The atoms of the crosslinker, having isocyanate units and having an aliphatic chain with more than 6 atoms, may be for example carbon atoms, nitrogen atoms, sulfur atoms, oxygen atoms and/or phosphorous atoms.

Preferably the atoms are carbon atoms.

The amount of carbon atoms in the aliphatic chain between the isocyanate groups of the crosslinker is preferably higher than 6 and may be less than for example 30 carbon atoms. Preferably the amount of carbon atoms is 8 or higher and more preferably 9 or higher.

Preferably the crosslinker is a blocked crosslinker because the isocyanate in the crosslinker must be protected in order to avoid the crosslinking reaction at room temperature and to provide good storage stability of the coating. A suitable blocking agent may be selected, for example, from the group consisting of caprolactam, imidazol, triazole, benzotriazole, pyrazole, oxime such as for example acetoxyoxime, ethyl acetoacetate, hydroxylamine, imide, N-hydroxylimide, phenol, cyclohexanol and malonic acid ester.

Suitable crosslinkers are for example: caprolactam blocked diisocyanates and triisocyanates, for example, 1,12-diisocyanatododecane, 1,8-diisocyanatodooctane, 1,8-diisocyanato(4-isocyanatomethyl)octane, 1,9-diisocyanatononane, 1,10-diisocyanatodecane, 1,11-diisocyanatoundecane trisisocyanate, 1,11-diisocyanato(3,6,9-trioxy)undecane and/or trisisocyanate.

As mentioned before, the polycarbonates of the invention can also be applied in water borne systems. Such systems can for example comprise the OH functional polycarbonate of the invention, a polyacrylate, and an organic polyisocyanate as crosslinker. The polyacrylate can be for example a resin that is obtainable by grafting a composition of unsaturated monomers onto a partially unsaturated hydroxyl functional polyester resin.

The organic polyisocyanate includes hydrophobic polyfunctional, preferably free polyisocyanates with an average NCO functionality of more than 2, preferably 2.5 to 5, and may be (cyclo)aliphatic, araliphatic or aromatic in nature. Preferably, the polyisocyanate has a viscosity at 22° C. of 0.1 to 5 Pa·s The polyisocyanate may include biuret, urethane, uretdione, and isocyanurate derivatives. Examples of a polyisocyanate include 1,6-hexane diisocyanate, 2,4-toluene diisocyanate, 2,6-toluene diisocyanate, diphenyl methane-diisocyanate, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-α,α-α',α'-tetramethyl xylylene diisocyanate, 1,8-diisocyanato-4-(isocyanatomethyl)octane, isophorone diisocyanate or bis(isocyanate cyclohexyl) methane, and the above-mentioned derivatives thereof and mixtures thereof. Normally, these products are liquid at ambient temperature and commercially available in a wide range. Preferred are cyclic trimers (isocyanurates) of 1,6-hexane diisocyanate and isophorone diisocyanate. Usually these compounds contain small quantities of their higher homologues. Also, isocyanate adducts may be used. Examples thereof are the adduct of 3 moles of toluene diisocyanate to 1 mole of trimethylol propane, the adduct of 3 moles of m-α,α-α',α'-tetramethyl xylene diisocyanate to 1 mole of trimethylol propane. Optionally, a hydrophilic polyisocyanate may be partially substituted for the hydrophobic polyisocyanate. Such a hydrophillic polyisocyanate may be a polyisocyanate compound substituted with non-ionic groups, such as the above-mentioned C1-C4 alkoxy polyalkylene oxide groups. Preferably 1 to 30 wt. % of non-ionic groups will be present on the total solid polyisocyanate compound, i.e. the organic, hydrophobic, and hydrophilic polyisocyanate, more preferably 2 to 20 wt. %, most preferably 5 to 15 wt. %. Preferred are the isocyanurates of 1,6-hexane diisocyanate and isophorone diisocyanate substituted with methoxypolyethylene glycol.

A water borne composition may also contain reactive diluents such as watersoluble mono- or (preferably) polyhydric alcohols. Examples of monohydric alcohols include hexyl glycol, butyoxyethanol, 1-methoxy-propanol-2,1-ethoxy-propanol-2,1-propoxypropanol-2,1-butoxy-propanol-2,2-methoxybutanol, 1-isobutoxy-propanol-2, dipropylene glycol monomethyl ether, diacetone alcohol, methanol, ethanol, propanol, isopropanol, butanol, 2-butanol, pentanol, hexanol, benzyl alcohol, and mixtures thereof. Examples of polyhydric alcohols include ethylene glycol, diethylene glycol, propylene glycol, isomeric butane diols, the polyethylene oxide glycols or polypropylene oxide glycols, trimethylol propane, pentaerythritol, glycerol, and mixtures thereof.

A water borne composition comprising the polycarbonate of the present invention comprises a solvent/dispersant that consists essentially of water, being an aqueous composition. However, about 20 wt. % of liquid content of the composition may be an organic solvent. As suitable organic solvents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxyethyl propionate, toluene, xylene, methylethyl ketone, methylisobutyl ketone, methylamyl ketone, ethylamyl ketone, dioxolane, N-methyl-2-pyrrolidone, dimethyl carbonate, propylene carbonate, butyrolactone, caprolactone, and mixtures thereof.

EXPERIMENTAL

Materials

Isosorbide (IS, polymer grade Polysorb® P, 98.5+%) and isoidide (II, 99.8%) were obtained as gifts from Roquette Freres. Isomannide (IM, 97+%) and isosorbide (98+%) were gifts from Agrotechnology and Food Innovations. Diethyl carbonate, 1,3-propanediol (PD, 99+%), methyl chloroformate, ethyl chloroformate, phenyl chloroformate, pyridine (anhydrous, 99.8%), triethylamine (99.5%), zinc acetate, citric acid (anhydrous, 99+%), diphosgene (trichloromethyl chloroformate, 97+%), tert-butyl glycidyl ether, triglycidyl isocyanurate (TGIC), dibutyltin dilaurate as well as normalized solutions of KOH in methanol were purchased from Aldrich. Titanium(IV) n-butoxide, diphenyl carbonate, dimethyl carbonate, trimethylolpropane, 4-dimethylaminopyridine and acetic anhydride were bought from Acros Organics. Triphosgene (bis(trichloromethyl carbonate) was obtained from Fluka, 1,4-butanediol was obtained from Merck. All solvents were supplied by Biosolve. DMSO-d6 was bought from Campro Scientific. Vestagon B1530 was a gift from Degussa, Desmodur N3600 and Desmodur BL3272 were gifts from Bayer AG. Irganox HP2921 was obtained as a gift from Ciba Specialty Chemicals. All chemicals were used as received.

Synthesis of Diphenyl Carbonate Derivatives of Isosorbide, Isoidide and Isomannide Dianhydrohexitol bis(phenyl carbonate)s were synthesized based on the three different dianhydrohexitols: isosorbide, isoidide and isomannide. The synthetic procedure was the same for the three isomers and is described here for isoidide:

Isoidide (15.05 g, 0.103 mol) and pyridine (17.96 g, 0.227 mol) were dissolved in 200 mL of tetrahydrofuran (THF). Phenyl chloroformate (35.47 g, 0.227 mol) was added dropwise during approximately 2 hours at 5-10° C. while stirring. The reaction was continued for 4 hours at room temperature. Subsequently, the reaction mixture was poured into demineralized water, affording a white precipitate. This solid was collected on a glass filter (pore size 4) and washed with a 5 wt % aqueous solution of $NaHCO_3$ and several times with water. The crude product was recrystallized from ethyl acetate, collected by filtration over a glass filter (pore size 4) and dried in vacuo at 40° C. [the same procedure was followed by Kricheldorf et al. Macromolecules 29, p. 8077, 1996 and Yokoe et al., J. Pol. Sci. part A, 41, p. 2312, 2003]. The yield was 65.7%. The purity was 98+%, as determined by 1H NMR.

Synthesis of Linear and Branched (Co)Polycarbonates from Dianhydrohexitol Bis(Aryl Carbonates)

Example 1

Isoidide bis(phenyl carbonate) (12.46 g, 32.0 mmol), 1,3-propanediol (2.94 g, 39.0 mmol), zinc acetate (0.05 mol % relative to the amount of diols) and Irganox HP 2921 (0.5 wt % relative to the amount of diols) were weighed into a 250 mL round-bottom glass flange reactor. The reactor was fitted with a Dean-Stark-type condenser to collect the condensation product. During the first part of the synthesis, the setup was continuously flushed with inert gas to limit oxidation and facilitate transport of phenol. While being stirred, the mixture was heated up to 185° C. using a heating mantle. Subsequently, the reaction temperature was increased stepwise to maintain distillation of the formed phenol. The maximum reaction temperature was 210° C. After 3 h, vacuum processing was started at 205-210° C., with typical pressures ranging from 1-5 mbar. Vacuum was applied until no more phenol was distilled off, after which the polymer was discharged from the reactor and left to cool and solidify. Yield: 7.19 g (76.2%). $M_n$=3100 g/mol, PDI=2.1, $T_g$=35.6° C., OH-value=76.4 mgKOH/g., which is equal to, 1.36 mmol OH/gram polymer or a calculated amount of 4,2 OH groups per molecule.

Example 2

Isosorbide bis(phenyl carbonate) (15.19 g, 39.3 mmol), isosorbide (2.41 g, 16.5 mmol), 1,3-propanediol (2.09 g, 27.5 mmol), trimethylolpropane (0.42 g, 3.1 mmol), zinc acetate (0.05 mol % relative to the amount of diols) and Irganox HP 2921 (0.5 wt % relative to the amount of diols) were weighed into a 250 mL round-bottom glass flange reactor. The reactor was fitted with a Dean-Stark-type condenser to collect the condensation product. During the first part of the synthesis, the setup was continuously flushed with inert gas to limit oxidation and facilitate transport of phenol. While being stirred, the mixture was heated up to 185° C. using a heating mantle. Subsequently, the reaction temperature was increased stepwise to maintain distillation of the formed phenol. The maximum reaction temperature was 210° C. After 3 h, vacuum processing was started at 205-210° C., with typical pressures ranging from 1-5 mbar. Vacuum was applied until no more phenol was distilled off, after which the polymer was discharged from the reactor and left to cool and solidify. Yield: 9.31 g (72.8%). $M_n$=3600 g/mol, PDI=3.2, $T_g$=78.8°

C., OH-value=50.4 mgKOH/g., which is equal to 0.90 mmol OH/gram polymer, or a calculated amount of 3,2 OH groups per molecule.

Synthesis of (Co)Polycarbonates Using Diphenyl Carbonate (Co)polycarbonates were synthesized by polycondensation of the different dianhydrohexitols, possibly in combination with other diol moieties, by transesterification with diphenyl carbonate.

Experiment 3

Isoidide (15.31 g, 105 mmol), diphenyl carbonate (20.40 g, 95 mmol), zinc oxide (1.6 mg, 2*10$^{-5}$ mol) and Irganox HP2921 (0.20 g) were weighed into a 250 mL round-bottom glass flange reactor. The reactor was fitted with a vigreux column and a Dean-Stark type condenser to collect the condensation product (in this case: phenol). During the first part of the synthesis, the setup was continuously flushed with inert gas to limit oxidation and facilitate removal of phenol from the reaction mixture. While stirring, the mixture was heated to 160° C. using a heating mantle, and a clear melt was obtained. Subsequently, the reaction temperature was increased stepwise up to 230° C., to maintain distillation of phenol. After 4 hours, vacuum processing was started at 230-245° C., with typical pressures ranging from 1-3 mbar. Vacuum processing was performed during 2 hours and resulted in a rapid increase in melt viscosity. The polymer was discharged from the reactor and left to cool and solidify. The product dissolves in chloroform, dichloromethane and hexafluoroisopropanol, but not in THF. Yield: 17.9 g (99%). $M_n$=4600 g/mol, PDI=2.3, $T_g$=148.2° C., OH-value=34.0 mgKOH/g, which is equal to 0.60 mmol OH/gram polymer Synthesis of (Co)Polycarbonates Using Triphosgene as Carbonyl Source (Co)polycarbonates were synthesized by polycondensation of dianhydrohexitols, possibly in combination with other diol moieties, by phosgenation. Instead of phosgene, its derivative triphosgene was used. The procedure is described for isosorbide.

Example 4

Isosorbide (3.35 g; 22.9 mmol), triphosgene (2.52 g; 8.5 mmol) and glycerol (0.37 g; 2.3 mmol) were weighed into a 250 mL round-bottom flask and subsequently dissolved in a mixture of 1,4-dioxane (20 mL) and dichloromethane (80 mL). Pyridine (8.37 g; 105.8 mmol), diluted with dichloromethane (20 mL) was added dropwise while stirring. After 7 hours, the reaction mixture was concentrated to one quarter of its original volume (by applying vacuum) and poured into cold methanol (500 mL). The precipitated polycarbonate was isolated by filtration and washed a second time by dissolution/precipitation from dichloromethane/methanol. Upon isolation, the polycarbonate was dried overnight at 40° C. in vacuo. Yield: 2.23 g (52%). $M_n$=3900 g/mol, PDI=3.3, $T_g$=109.8° C., OH-value=33.3 mgKOH/g, which equals 0.59 mmol OH/g polymer or a calculated amount of 2,3 OH groups per molecule.

Curing of Biobased (Co)Polycarbonates Using Conventional Cross-Linkers.

Hydroxyl functional (co)polycarbonates were cured using: I) a trimer of hexamethylene diisocyanate (NCO equivalent weight=183 g/mol, trade name: Desmodur N3600) and II) an ε-caprolactam blocked trimer of isophorone diisocyanate (NCO equivalent weight=275 g/mol, trade name: Vestagon B1530). Ad 1) A solution of 0.3-0.5 g of polycarbonate in 0.8 mL of N-methyl-2-pyrrolidone (NMP) was prepared, as well as a separate solution of Desmodur N3600 (1.05 molar equivalent, calculated from titration data) in 0.2 mL of NMP. The two solutions were mixed and applied directly to the aluminum substrate as a wet film with a thickness of 250 μm, using a doctor blade. After drying at room temperature, the film was cured at 180° C. under $N_2$ during 20 minutes. Ad 2) A solution of 0.3-0.5 g of polycarbonate, 1.05 molar equivalent of the cross-linker and 0.5 wt % (relative to the amount of polycarbonate used) of dibutyltin dilaurate in 1 mL of NMP was prepared. Subsequently, a film of approximately 250 μm thickness was applied onto an aluminum panel. The film was left to dry at room temperature, followed by curing at 200° C. during 30 minutes under nitrogen. Both types of curing agents resulted in poly(carbonate urethane) coatings.

Coating Properties

Examples 5-10

| Example | polycarbonate example | curing agent [1] | $T_{cure}$ [° C.] | $t_{cure}$ [min] | acetone resistance [2] | impact test [1 kg, 100 cm] [3] |
|---|---|---|---|---|---|---|
| 5 | 1 | I | 180 | 20 | + | + |
| 6 | 1 | II | 200 | 30 | + | +/− |
| 7 | 2 | I | 180 | 20 | + | + |
| 8 | 2 | II | 200 | 30 | + | +/− |
| 9 | 3 | I | 180 | 20 | + | + |
| 10 | 4 | I | 180 | 20 | + | +/− |

[1] I = Desmodur N3600, II = Vestagon B1530
[2] determined by rubbing wit a cloth drenched in solvent; + = good, +/− = moderate, − = poor
[3] determined by reverse impact testing; + = good, +/− = moderate, − = poor All coatings have good solvent and impact resistance. Their König hardnesses are approximately 200-220 s. Their average film thicknesses are between 30 and 50 μm. The coatings are colorless to pale yellow, transparent and glossy.

Measurements

SEC analysis was carried out using a set-up equipped with a Shimadzu LC-10AD pump and a WATERS 2414 differential refraction index detector (at 35° C.). Injections were done by a MIDAS auto-injector, the injection volume being 50 μL. PSS (2*PFG-lin-XL, 7 μm, 8*300 mm, 40° C.) columns were used. 1,1,1,3,3,3-hexafluoro-2-propanol (HFIP) was used as eluent at a flow rate of 1.0 mL/min. Calibration curves were obtained using PMMA standards. Data acquisition and processing were performed using Viscotek OmniSec 4.0 and Waters Empower 2.0 software.

$^1$H NMR and $^{13}$C NMR spectra were obtained using a Varian Mercury Vx (400 MHz) spectrometer, deuterated chloroform was used as the solvent (unless stated otherwise).

The thermal stabilities of polymer samples were determined using a Perkin-Elmer Pyris 6 TGA apparatus. Approximately 10 mg of polymer was heated from 40° C. to 700° C. at a heating rate of 10° C./min under a $N_2$ flow of 20 mL/min. Results were analyzed using Pyris 4.01 software.

DSC measurements were carried out with a DSC Q100 from TA Instruments. MALDI-ToF-MS measurements were performed on a Voyager DE-STR from Applied Biosystems. Calibrations were carried out with poly(ethylene oxide) standards for the lower mass range and polystyrene standards for the higher mass range. The mass accuracy was better than 0.2

Dalton, the mass resolution was approximately m/z 12,000. DCTB (trans-2-[3-(4-tert-butylphenyl)-2-methyl-2-propenylidene]malononitrile) was used as matrix. Potassium trifluoroacetate (Aldrich, >99%) was used as cationization agent. Solutions of the matrix (40 mg/mL), potassium trifluoroacetate (5 mg/mL) and the polyester sample (1 mg/mL) in THF were premixed in a ratio of 5:1:5. The mixture was subsequently hand-spotted on the target and left to dry. Spectra were recorded in reflector mode at positive polarity.

Potentiometric titrations were carried out using a Metrohm Titrino 785 DMP automatic titration device fitted with an Ag titrode. All titrations were carried out in duplo. Polyester hydroxyl end-groups were acetylated in solution (NMP) with acetic anhydride at room temperature (4-dimethylaminopyridine was used as catalyst), followed by titration of the resulting acetic acid with a normalized 0.5 N methanolic KOH solution. Blank measurements were necessary to obtain the hydroxyl values. The hydroxyl value (OHV) is the number of milligrams of potassium hydroxide equivalent to the hydroxyl groups in 1 g of material (see the equation below). All titrations were carried out in duplo.

$$OHV = \frac{(V_b - V_s) \times N \times 56.1}{W_s}$$

With OHV=hydroxyl value (mgKOH/g), $V_b$=volume of methanolic KOH solution needed to titrate the blank (mL), $V_s$=volume of methanolic KOH solution needed to titrate the sample (mL), N=normality of KOH solution (mol/L), 56.1=molar mass of KOH (g/mol) and $W_s$=sample weight (g).

Dynamic Mechanical Analysis (DMA) was carried out using a TA Instruments AR1000-N Rheolyst rheometer, having a parallel plate geometry. Data acquisition was done with Rheology Advantage Instrument Control Ar software, data analysis with Rheology Advantage Data Analysis software.

Cross-linking and coating performance at room temperature were evaluated using several characterization methods: acetone rub test (solvent resistance test: the sample is rubbed with a cloth drenched in acetone. If no damage is visible after 150-200 rubs, the coating has good acetone resistance), rapid deformation test (reverse impact test, ASTM D 2794) and pendulum damping test (ASTM D 4366, to determine Konig hardness).

The invention claimed is:

1. A coating composition comprising at least one crosslinker and a polycarbonate containing a bicyclic ether diol residue produced from a polysaccharide and expressed by the following formula (5):

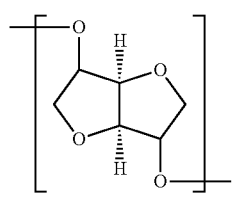

formula 5 and a polyol residue, wherein the polycarbonate comprises between 0.2 and 5 mmol hydroxyl groups per gram polymer.

2. The coating composition according to claim 1, wherein the polycarbonate comprises between 0.4 and 1.5 mmol hydroxyl groups per gram polymer.

3. The coating composition according to claim 1, wherein the polycarbonate has a number average molecular weight between 1000 and 10.000 gram/mol.

4. The coating composition according to claim 1, wherein the ether diol residue is derived from anyone of the following molecules

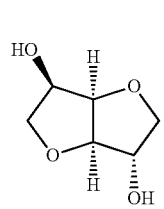

formula 2

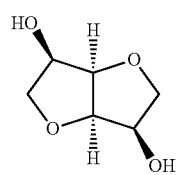

formula 3

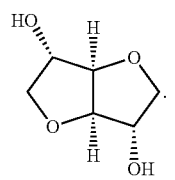

formula 4

5. The coating composition according to claim 1, wherein the amount of ether diol residue ranges between 30-95 wt % of the polycarbonate.

6. The coating composition according to claim 1, wherein the polyol residue is derived from aliphatic polyols comprising a mixture of diols and polyols having 3 to 6 OH groups.

7. The coating composition according to claim 6, wherein the ratio between diol and polyols having 3-6 OH groups is between 4 and 50.

8. The coating composition according to claim 6, wherein the diols are chosen from the group consisting of are ethylene glycol, diethylene glycol, polyethylene glycol, propylene glycol, dipropylene glycol and polypropylene glycols, 1,5-pentanediol, cyclohexanediol, cyclohexanedimethanol, propane-1,2-diol, propane-1,3-diol, butane-1,2-diol, butane-1,3-diol, butane-1,4-diol, butane-2,3-diol, 2,2-dimethylpropanediol-1,3 (=neopentyl glycol), hexane-2,5-diol, hexane-1,6-diol, 2,2-bis-(4-hydroxy-cyclohexyl)-propane (hydrogenated bisphenol-A), 2,2-bis[4-(2-hydroxy ethoxy)-phenyl]propane, the hydroxy pivalic ester of neopentyl glycol, butylethylpropane diol, ethylmethylpropane diol, hydrated bisphenol-A, 2,2-bis-(2-hydroxyethoxy)phenylpropane and 2,2-bis-2-hydroxypropoxy phenylpropane.

9. The coating composition according to claim 6, wherein the polyols having between 3-6 OH groups are chosen from the group consisting of trimethylolpropane, trimethylolethane, pentaerythritol, 1,3,5-cyclohexanetriol, glycerol and sorbitol.

10. The coating composition according to claim 1, wherein the coating composition is a powder coating composition and wherein the glass transition temperature (Tg) of the powder coating composition lies above 20° C., the Tg being determined by differential scanning calorimetry (DSC) at a heating rate of 10° C./min.

11. The powder coating composition according to claim 10, wherein the groups of the crosslinker which are capable of reacting with hydroxyl groups are isocyanate groups, the isocyanate functionality of the crosslinker being between 2 and 6.

12. The powder coating composition according to claim 10, wherein the crosslinker having isocyanate units and having an aliphatic chain with more than 6 atoms, the atoms being selected from the group consisting of carbon atoms, nitrogen atoms, sulfur atoms, oxygen atoms and phosphorous atoms.

13. The powder coating composition according to claim 10, wherein the crosslinker is blocked with a blocking agent, the blocking agent being selected from the group consisting of caprolactam, imidazol, triazole, benzotriazole, pyrazole, oximes, ethyl acetoacetate, hydroxylamine, imide, N-hydroxylimide, phenol, cyclohexanol and malonic acid ester.

14. The powder coating composition according to claim 10, wherein the crosslinker is a caprolactam blocked diisocyanate or triisocyanate, wherein the diisocyanate or triisocyanate is selected from the group consisting of 1,12-diisocyanatododecane, 1,8-diisocyanatodooctane, 1,8-diisocyanato(4-isocyanatomethyl)octane, 1,9-diisocyanatononane, 1,10-diisocyanatodecane, 1,11-diisocyanatoundecane trisisocyanate, 1,11-diisocyanato(3,6,9-trioxy)undecane and trisisocyanate.

15. A process for curing a powder coating of claim 10, wherein the powder coating is cured in a curing time of between 1-15 minutes and at a temperature of between 135° C. and 250° C.

16. The coating composition according to claim 1, wherein the coating composition is a solvent borne or water borne coating composition.

17. The coating composition according to claim 16, wherein the coating composition is a water borne system and comprises the OH functional polycarbonate with general formula 5, a polyacrylate, and an organic polyisocyanate as crosslinker.

18. The coating composition according to claim 16, wherein the polyisocyanate has an average NCO functionality of between 2.5 and 5.

19. The coating composition according to claim 18, wherein the polyisocyanate is selected from the group consisting of 1,6-hexane diisocyanate, 2,4-toluene diisocyanate, 2,6-toluene diisocyanate, diphenyl methane-diisocyanate, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-$\alpha,\alpha$-$\alpha',\alpha'$-tetramethyl xylylene diisocyanate, 1,8-diisocyanato-4-(isocyanatomethyl)octane, isophorone diisocyanate or bis(isocyanate cyclohexyl)methane, and mixtures thereof.

20. The coating composition according to claim 17, wherein the polyisocyanate comprises between 1-30 wt % of non-ionic groups, with respect to the total solid polyisocyanate compound.

21. The coating composition according to claim 16, comprising a reactive diluent being a polyhydric alcohol selected from the group consisting of ethylene glycol, diethylene glycol, propylene glycol, isomeric butane diols, the polyethylene oxide glycols or polypropylene oxide glycols, trimethylol propane, pentaerythritol, glycerol, and mixtures thereof.

* * * * *